United States Patent Office

2,809,977
Patented Oct. 15, 1957

2,809,977

PURIFICATION OF STEROIDS

Klaus G. Florey and Josef Fried, New Brunswick, N. J., assignors to Olin Mathieson Chemical Corporation, New York, N. Y., a corporation of Virginia No Drawing. Application March 29, 1955,
Serial No. 497,814

8 Claims. (Cl. 260—397.45)

This invention relates to the purification of steroids; and it has for its object the provision of an advantageous method of separating certain 9α-halo steroids from genetic contaminants, as well as the provision of valuable products derived from 9α-halo steroids and useful in the purification of said steroids.

In the production of 9α-halo steroids by reaction of the corresponding 9β,11β-oxido derivative with a hydrogen halide [cf. U. S. Patent application of Josef Fried, Serial No. 417,489, filed March 10, 1954], the steroid product is obtained admixed with various by-products. One of these impurities is a high-melting, high-rotating substance of unknown constitution [cf. Fried et al., Journal of the American Chemical Society 76, 1455 (1954)], which cannot readily be separated from the desired product by usual procedures, such as crystallization from organic solvents (e. g. chloroform, ethyl acetate and acetone). It has now been found, however, that 9α-halo steroids thus produced can readily be separated from this high melting substance, as well as other genetic contaminants, simply by converting the 9α-halo steroid component into an association or complex thereof with an aromatic hydrocarbon, such as benzene and toluene, recovering this complex, and treating the complex to obtain the free purified 9α-halo steroid.

The complexes of this invention may be solvate adducts, or may embody the aromatic hydrocarbon in the crystalline structure; but it is not intended that the invention, or the term "complex" as used herein, be limited to any theoretical explanation. It is known, however, that in general one-half mole of hydrocarbon (e. g. benzene or toluene) is present per mole of steroid in the complex, regardless of the proportion of hydrocarbon to steroid in the reaction mixture.

To prepare the complexes of this invention, the 9α-halo steroid is mixed with the aromatic hydrocarbon in the presence of an organic solvent for the steroid. Although the invention is applicable to the purification of any 9α-halo steroid, it is especially advantageous for the purification of the 9α-halohydrocortisones and the 21-esters thereof. Examples of such esters are those of the hydrocarbon carboxylic acids having less than ten carbon atoms, such as the lower alkanoic acid esters (e. g. acetate, propionate, butyrate, and hexanoate), the aromatic hydrocarbon carboxylic acid esters (e. g. benzoate, toluylate, and naphthoate), and the aralkanoic acid esters (e. g. phenylacetate). The process of this invention is particularly adapted for the separation of 9α-fluorohydrocortisone and its esters from genetic contaminants.

Although a great many aromatic hydrocarbons may form complexes with the 9α-halo steroids, the preferred aromatic hydrocarbons are those of less than ten carbon atoms, as exemplified by benzene and toluene. Since the complexes formed generally contain one-half mole of aromatic hydrocarbon per mole of steroid, to insure maximum yields of the desired complex, at least one-half mole of aromatic hydrocarbon per mole of steroid should be present in the reaction mixture. Any excess of aromatic hydrocarbon can be used, however, since the nature of the complex is not affected thereby, and the solubility of the complex therein is such that there is no material decrease in recoverable complex.

The reaction of the steroid and aromatic hydrocarbon is conducted in the organic solvent (usually directly in the solvent employed for the preparation of the 9α-halo steroid). Any organic solvent may be used provided, of course, that the 9α-halo steroid is soluble therein and that the steroid-aromatic hydrocarbon complex formed is precipitated therefrom upon addition of the aromatic hydrocarbon. Examples of suitable solvents fulfilling these two conditions are the halogenated alkanes (e. g. chloroform and ethylene dichloride). The ratio of solvent to steroid is not critical and is limited only by the minimum amount of solvent necessary to dissolve the steroid, which is the preferred amount employed. To insure adequate yields of complex, at least one part by volume of aromatic hydrocarbon should be used per part by volume of solvent. If substantially less than one part of aromatic hydrocarbon per part of solvent is used, the yield of complex is materially reduced, to a point, where if only a small proportion of aromatic hydrocarbon is used, no recoverable amount of complex is formed. Any excess of aromatic hydrocarbon can be used, however, without adversely effecting the complex formation.

By mixing the aromatic hydrocarbon and 9α-halo steroid in an organic solvent at any temperature (say ambient temperature), a complex of the aromatic hydrocarbon and the steroid is selectively produced. This complex precipitates from the organic solvent, and may be recovered by filtration, centrifugation, etc., thereby isolating the 9α-halo steroid, in the form of its complex, substantially free from genetic contaminants which remain in solution.

To decompose the complex and recover the free 9α-halo steroid, the complex is mixed with sufficient organic solvent to dissolve the complex, and the free steroid is precipitated therefrom by reducing the solubilizing capacity of the solvent. Among the solvents which may be used are the halogenated alkanes (e. g. chloroform), ketones (e. g. acetone), organic esters (e. g. ethyl acetate), and alcohols (e. g. ethanol). The solubilizing capacity of the organic solvent may be decreased, inter alia, either by dissolving the complex in any sufficient quantity of solvent and concentrating the solution by evaporation of the solvent, or by mixing the complex with a minimum amount of solvent, heating the mixture to dissolve the complex, and then cooling the solution to precipitate the free 9α-halo steroid.

The invention is illustrated by the following examples:

EXAMPLE 1

*Complex of 9α-fluorohydrocortisone acetate and benzene*

To 50 ml. of a chloroform solution, derived from a reaction of $\Delta^4$-pregnene-9β,11β-oxido-17α,21-diol-3,20-dione 21-acetate with hydrogen fluoride, and containing approximately 2.4 g. of 9α-fluorohydrocortisone acetate, 1.2 g. of high melting by-product, 1.0 g. of cortisone acetate and 0.6 g. of other impurities, is added 75 ml. of benzene. The mixture is allowed to crystallize for several hours, after which about 2.5 g. of the 9α-fluorohydrocortisone acetate-benzene complex is isolated as a precipitate. This complex melts at about 227–229° C.; $[\alpha]_D^{25}$ +118° (in acetone). On drying for three hours at 100° C./1 mm. Hg pressure, a loss of about 0.66% is observed.

*Microanalysis.*—Calculated for 9α-fluorohydrocortisone acetate+½ benzene (molecular weight 461.53): C, 67.66; H, 7.44. Found: C, 67.24; H, 7.24.

The infrared spectrum displays a prominent band at 14.6µ characteristic of benzene.

The same results are obtained when 100 and 200 ml. of benzene are used.

EXAMPLE 2

*Complex of 9α-fluorohydrocortisone acetate and toluene*

To 50 ml. of the chloroform solution described in Example 1 is added 100 ml. of toluene. The mixture is allowed to crystallize for several hours, whereupon about 2.6 g. of 9α-fluorohydrocortisone acetate-toluene complex is isolated. This complex melts at about 227–229° C.; $[\alpha]_D^{25}$ +118° (in acetone).

*Microanalysis.*—Calculated for 9α-fluorohydrocortisone acetate+½ toluene (molecular weight 468.55): C, 67.93; H, 7.53. Found: C, 67.38; H, 7.21.

EXAMPLE 3

*Recovery of pure 9α-fluorohydrocortisone acetate from its benzene complex*

3.0 g. of the 9α-fluorohydrocortisone acetate-benzene complex obtained in Example 1 is refluxed in 45 ml. of ethyl acetate until all of the steroid is dissolved. The solution is then allowed to cool to room temperature, and a crystalline crop of about 2.1 g. of pure 9α-fluorohydrocortisone acetate, M. P. about 227–229° C., is collected. Additional crops of 9α-fluorohydrocortisone acetate are obtained by concentrating the mother liquor.

The procedure of Example 3 can be carried out with any organic solvent in which the 9α-fluorohydrocortisone acetate-benzene complex is sufficiently soluble.

EXAMPLE 4

*Recovery of pure 9α-fluorohydrocortisone acetate from its toluene complex*

3.0 g. of the 9α-fluorohydrocortisone acetate-toluene complex obtained in Example 2 is refluxed in 45 ml. of acetone until all the steroid is dissolved. The solution is then allowed to cool to room temperature and a crystalline crop of about 2.0 g. of pure 9α-fluorohydrocortisone acetate, M. P. about 227–229° C. is collected. Additional crops of 9α-fluorohydrocortisone acetate are obtained by concentrating the mother liquor.

The procedure of Example 4 can be carried out with any organic solvent in which the 9α-fluorohydrocortisone acetate is sufficiently soluble.

The invention may be variously otherwise embodied within the scope of the appended claims.

We claim:

1. A crystalline complex of 9α-fluorohydrocortisone acetate and an aromatic hydrocarbon selected from the group consisting of benzene and toluene, wherein about one-half mole of aromatic hydrocarbon is present per mole of 9α-fluorohydrocortisone acetate.

2. A crystalline complex of a 9α-halo steroid selected from the group consisting of 9α-halohydrocortisone and esters thereof with hydrocarbon carboxylic acids having less than ten carbon atoms and an aromatic hydrocarbon of less than ten carbon atoms.

3. The complex of claim 2 wherein about one-half mole of aromatic hydrocarbon is present per mole of steroid.

4. The complex of claim 3 wherein the aromatic hydrocarbon is selected from the group consisting of benzene and toluene.

5. The method of separating a 9α-halo steroid selected from the group consisting of 9α-halohydrocortisone and esters thereof with hydrocarbon carboxylic acids having less than ten carbon atoms and produced by the reaction of the corresponding 9β,11β-oxido derivative with a hydrogen halide from genetic contaminants, which comprises forming a complex of the 9α-halo steroid with an aromatic hydrocarbon of less than ten carbon atoms, recovering the complex, and treating the complex to obtain the free steroid.

6. The method of claim 5, wherein the aromatic hydrocarbon is selected from the group consisting of benzene and toluene.

7. The method of claim 6 wherein the 9α-halo steroid is 9α-fluorohydrocortisone acetate.

8. The method of claim 5, wherein the 9α-halo steroid is produced by the reaction in an organic solvent of the corresponding 9β,11β-oxido derivative with a hydrogen halide and the complex is formed directly in said organic solvent by the addition of at least one volume of said aromatic hydrocarbon per volume of organic solvent.

References Cited in the file of this patent

UNITED STATES PATENTS

| | | |
|---|---|---|
| 2,703,799 | Bergstrom | Mar. 8, 1955 |
| 2,707,190 | Farrar | Apr. 26, 1955 |
| 2,730,525 | Hogg | Jan. 10, 1956 |

OTHER REFERENCES

Fried et al.: Jour. Am. Chem. Soc. 75, 2273–2274 (1953), 76, 1455–1456 (1954).